(12) United States Patent
Webb

(10) Patent No.: US 6,315,525 B1
(45) Date of Patent: Nov. 13, 2001

(54) MULTI-PURPOSE CLEAN AIR FAN AND FAN MOTOR MOUNT ASSEMBLY

(75) Inventor: Terence Webb, Nepean (CA)

(73) Assignee: Microzone Corporation, Ontario (CA)

( * ) Notice: Subject to any disclaimer, the term of this patent is extended or adjusted under 35 U.S.C. 154(b) by 0 days.

(21) Appl. No.: 09/204,605

(22) Filed: Dec. 3, 1998

(51) Int. Cl.[7] .............................. F04D 25/08; B01D 46/00
(52) U.S. Cl. ...................... 417/313; 417/363; 417/423.9; 96/385; 415/121.2; 415/208.1; 415/211.1; 454/186
(58) Field of Search ...................... 417/313, 363, 417/423.9, 423.14; 415/121.2, 208.1, 211.1, 213.1, 214.1; 55/385.2, 472, 473; 96/385; 454/186, 187, 338

(56) References Cited

U.S. PATENT DOCUMENTS

| | | | |
|---|---|---|---|
| 4,088,463 | 5/1978 | Smith | 55/480 |
| 4,344,784 | 8/1982 | Deckas et al. | 55/473 |
| 4,560,395 | 12/1985 | Davis | 55/276 |
| 5,053,065 | 10/1991 | Garay et al. | 55/470 |
| 5,496,389 | 3/1996 | Wilcox | 55/473 |
| 5,803,721 | * 9/1998 | Lee | 417/423.14 |
| 6,156,085 | * 12/2000 | Chiu et al. | 55/472 |

FOREIGN PATENT DOCUMENTS 8-309129 * 11/1996 (JP).
9-137979 * 5/1997 (JP).

* cited by examiner

Primary Examiner—Andrew M. Dolinar
(74) Attorney, Agent, or Firm—Olson & Hierl, Ltd.

(57) ABSTRACT

A multi-use clean air fan and fan motor mount assembly comprising a bifurcated conical air inlet and blown air deflector, a fan motor mount, motor mount supports, a fan motor and a fan, the bifurcated conical air inlet and blown air deflector having a long outer wall, and a short inner wall, the fan motor mount suspended within the bifurcated conical air inlet and blown air deflector by motor mount supports fastened between the outer wall of the bifurcated conical air inlet and blown air deflector and the fan motor mount, an aperture defining a central opening in the top of the bifurcated conical air inlet and blown air deflector, the fan and fan motor having a common longitudinal axis with the longitudinal axis of the bifurcated conical air inlet and blown air deflector, the fan having a series of vanes extending outwardly from the central longitudinal axis of the fan, the inside of the long outer wall of the bifurcated conical inlet and blown air deflector surrounding more than half of the longitudinal height of the vanes of the fan.

9 Claims, 8 Drawing Sheets

MULTI-PURPOSE CLEAN AIR FAN AND FAN MOTOR MOUNT ASSEMBLY

SUMMARY OF THE INVENTION

The present invention relates to a multi-use fan and fan motor mount assembly for use in clean air fan filter modules and workstations, clean room ceiling systems, sterile suite ceiling systems, and modular or mobile soft wall clean air units.

The multi-use fan and fan motor mount assembly has an improved integral air or pre-filtered air inlet and blown air deflector in the shape of a bifurcated conical ring. The fan and fan motor are supported by motor mounts fastened to the lower outer wall portion of the conical ring. The fan and fan motor are supported substantially within the interior conical wall of the bifurcated conical air inlet and blown air deflector which results in an increase in the air pressure delivered by the fan motor mount assembly relative to existing fan motor mount assemblies. The impeller of the fan motor mount unit is mounted within the interior sides of the bifurcated conical ring such that to $2/3$ to $3/4$ of the fan vanes are disposed within the conical side walls.

The increase in air pressure delivered by the fan and fan motor mount assembly of this invention results in improved fan efficiency for a given final filter resistance. This increase in efficiency along with lower resistance in the fan and fan motor mount assembly results in noise abatement and energy savings.

The fan and fan motor mount assembly may be fastened directly to a subceiling of a clean room with the clean air inlet accessible to prefiltered clean air above the subceiling. A second subceiling below the fan motor mount assembly supports a series of final filters which filter the air exiting from the blown air deflector before the filtered air enters the clean room. In the event that prefiltered clean air is not available for a clean room the fan and fan motor mount assembly are fastened to a pre-filter assembly which will pre-filter the air entering into the clean air inlet of the multi-use fan motor mount assembly.

Another use of the multi-use fan and fan motor mount assembly is as part of modular or mobile soft wall clean air units. In such uses the multi-use fan and fan motor mount assembly is integrally connected with a pre-filter assembly and with a final filter assembly. The final filters which are part of the final filter assembly or part or all of a clean room or sterile suite ceiling system are normally HEPA (high efficiency particulate air) or ULPA (ultra-low penetration air filters), but other types of filters having different efficiency ranges may be used in particular applications.

Another aspect of the invention is an improved air pre-filter assembly. The improved air pre-filter assembly features a solid top above the air inlet to the multi-use fan and fan motor mount assembly. The solid top has at least two curved sides with apertures to receive air perpendicularly to the centerline of the air inlet of the multi-use fan and fan motor mount assembly.

The apertures or pattern of openings on the side or sides of the pre-filter assembly are covered with a pre-filter to remove larger particles from the air entering the air inlet of the multi-use fan and fan motor mount assembly. The pre-filter assembly receives air through the side surface areas of the surround filter which surface areas are substantially greater than the surface area provided in existing pre-filter assemblies in which air is received through the top of a filter placed directly over the air inlet of the fan. The use of openings in the side or sides of the pre-filter of this invention provides a larger surface area in which to pre-filter air which reduces the resistance to flow of air through the pre-filter assembly into the air inlet of the fan and fan motor mount assembly.

The improved air filter assembly providing an increased air inlet surface area results in a reduction in energy necessary to draw air into the clean air fan motor mount assembly.

The disposition of the fan within the conical sidewall results in increased air pressure necessitating less fan energy to supply the final filter and associated noise abatement.

BACKGROUND OF THE INVENTION

In existing clean air fan filter modules the fan is mounted primarily within the final filter assembly which compresses the air within the final filter assembly resulting in pressures above the final filter higher than necessary to pass air through the final filter. By mounting the fan and vanes substantially within the interior walls of the bifurcated conical ring the same volume of air may be supplied to the final filter assembly at a lower fan speed with less energy consumption and less noise, than in systems where the fan and vanes are located primarily in the final filter assembly. The centrifugal fan is used in conjunction with a speed control to achieve the desired air throughput through the final filter assembly. The higher deflected air pressure produced by mounting the fan and vanes substantially within the interior walls of the bifurcated conical ring also enables the fan motor mount assembly to be used in association with filters which create more back pressure than conventional final filters.

The air pre-filter assembly has been designed with side entry of incoming air to overcome two of the disadvantages of top entry pre-filters. When clean air fan filter modules are mounted in rooms where there is little space above the structure in which the clean air fan filter module is mounted, the air supply to the pre-filter assembly may be interfered with by the ceiling or structure. The use of a solid top on the pre-filter assembly of the invention combined with the larger relative surface area on the sides of the pre-filter assembly having apertures defining openings overcomes resistance to air flow found in top entry pre-filters in confined vertical spaces.

Another advantage of a side entry pre-filter is that a substantial increase of the pre-filter intake surface area may be created than is possible with an air pre-filter having the air entry to the pre-filters immediately above the air inlet to the fan motor mount assembly. In the pre-filter assembly of this invention the air pre-filter apertures and material are attached over the openings in the sides of a continuous top plate having apertures defining openings. The remaining sides and the top of the pre-filter assembly do not have apertures defining openings. Increasing the surface area of the filter material in contact with the air decreases the static pressure through the filter material and the amount of energy necessary to pull the air through the pre-filter material.

DESCRIPTION OF THE PREFERRED EMBODIMENTS

Figure 1:
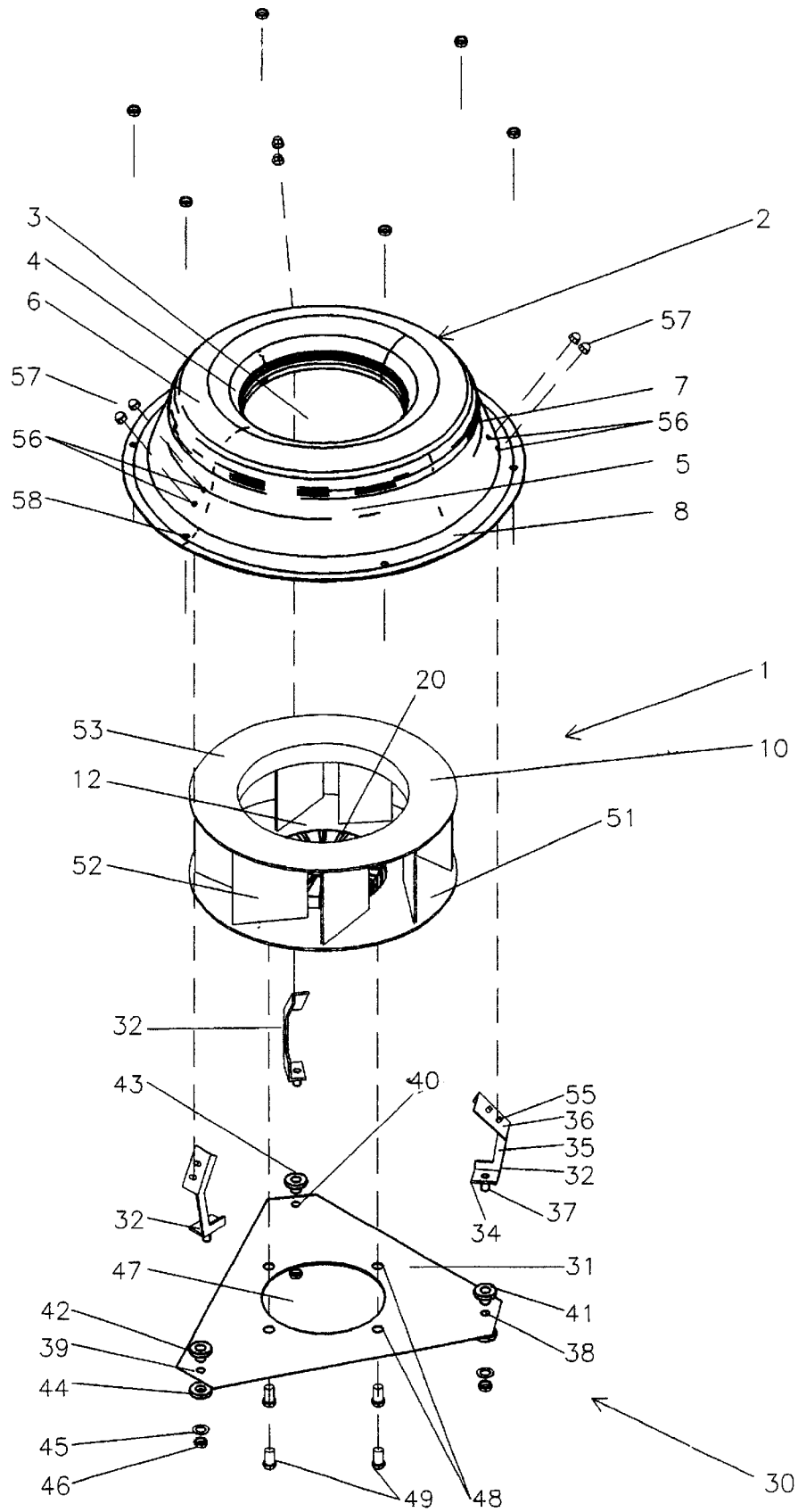
FIG. 1 is an exploded view of the multi-use fan and fan motor mount assembly.

Referring to FIG. 1, there is shown an exploded view of a multi-use clean air fan and fan motor assembly 1 of this invention. The multi-use fan and fan motor assembly is comprised of a bifurcated conical air inlet and blown air deflector 2, fan 10, fan motor 20, and fan motor mount and vibration isolation system 30.

Figure 4:
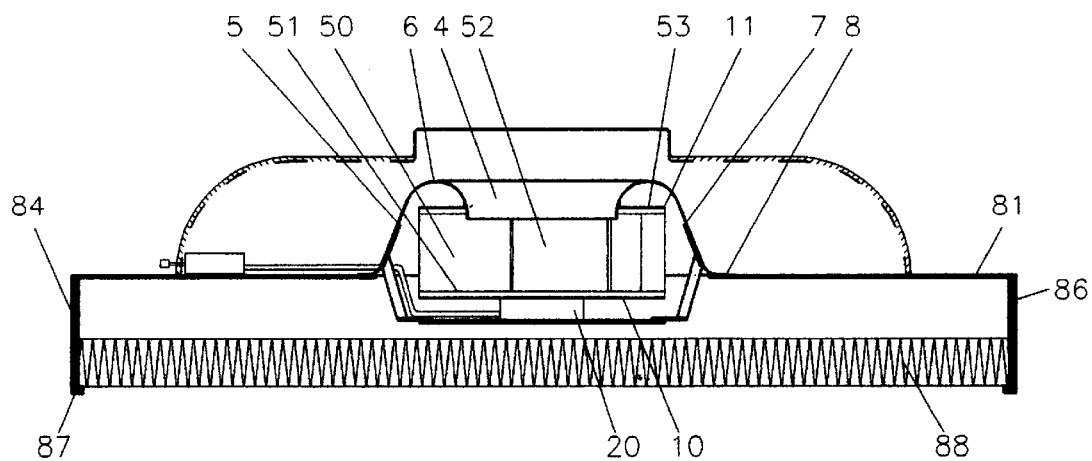
FIG. 4 is a cross-sectional view of the clean air fan filter module of FIG. 2 in which the walls of the final filter are integral with the top wall.
Figure 5:
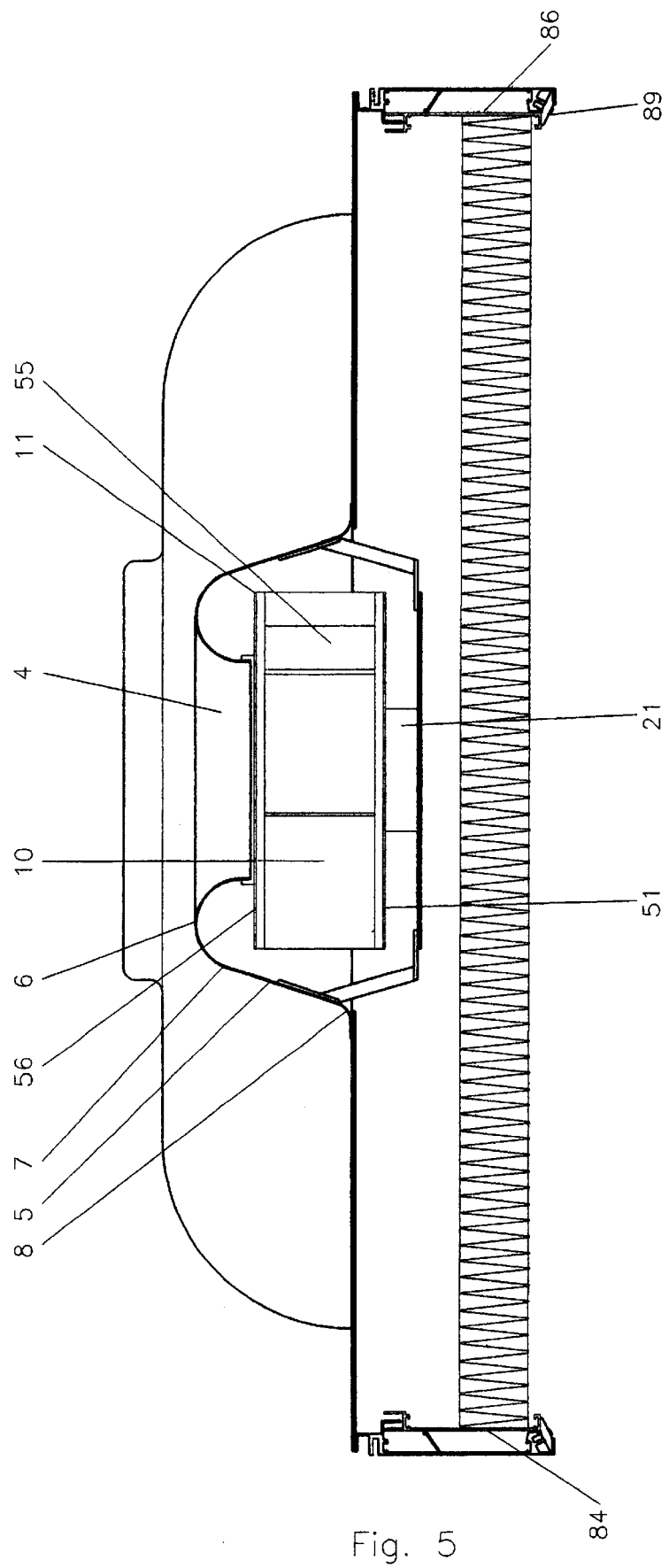
FIG. 5 is a cross-sectional view of a clean air fan filter module of this invention in which the final filter module is removable from below.

The bifurcated conical air inlet and blown air deflector 2 has a space defining a central opening 3 with a short interior wall 4, and a long outer wall 5 connected to the short interior wall 4 by a convex section 6 comprising the top of the bifurcated conical air inlet and blown air deflector 2. As seen in FIGS. 4 and 5, the long outer wall 5 has an upper outwardly inclined section 7 and a lower flared section 8 which flares outwardly perpendicularly to the longitudinal central axis of the bifurcated conical air inlet and blown air deflector 2. The distance between opposed points on the interior of the long outer wall 5 immediately below the short interior wall 4 are slightly greater than the outer dimension 11 of the fan 10. The distance between opposed points of the short interior wall 4 are slightly less than the central interior opening 12 in the top of the fan 10. Approximately two-thirds to three quarters of the fan 10 is located within the bifurcated conical air inlet and blown air deflector 2 with the central opening 12 of the fan and the central opening 3 of the bifurcated conical air inlet and blown air deflector having as a common central axis, the longitudinal central axis of the bifurcated conical air inlet and blown air deflector 2.

Referring to FIG. 1, the fan motor mount and vibration isolation system 30 is comprised of a generally triangular fan motor base 31 which is suspended by fan motor mounts 32. The three fan motor mounts 32 each have a lower horizontal section 34, a central vertical section 35 and an upper inclined section 36. The lower horizontal section 34 of the three fan motor mounts 32 has a threaded stud 37 extending vertically downward from respective lower horizontal sections 34. The generally triangular fan motor base 31 has truncated corners with apertures defining openings 38, 39 and 40 interiorily of the truncated corners of generally triangular fan motor base 31 to receive the respective threaded studs 37 extending vertically downward from respective lower horizontal sections 34 of the three motor mounts 32. Rubber isolation T's 41, 42 and 43 having central apertures defining openings are placed over the respective threaded studs 37 before the studs 37 are placed through the openings 38, 39 and 40 interior of the generally truncated corners of generally triangular fan motor base 31. Rubber washers 44, steel washers 45 are located over the portion of threaded studs 37 extending through the opening 38, 39 and 40 of fan motor base 31 and nuts 46 are threaded on threaded studs 37 of respective motor mounts to secure the lower horizontal sections 34 of respective fan motor mounts 32 to the generally triangular fan motor base 31. The rubber isolation T's 41, 42 and 43 and rubber washers 44 between the three motor mounts 32 and generally triangular fan motor base 31 dampen and attenuate vibration and noise.

The upper inclined section 36 of the three motor mounts 32 each have two upwardly extending threaded studs 55 which are inserted through matching apertures 56 in the lower flared section 8 of the frusto-conical air inlet and blown air deflector 2. The threaded studs 55 of the upper inclined sections 36 of the three motor mounts 32 are secured to the lower flared section 8 of the frusto-conical air inlet and blown air deflector 2 by a series of bolts 57 and threaded onto threaded studs 55 on top of the lower flared section 8 of the frusto-conical air inlet and blown air deflector 2.

The generally triangular fan motor mount base 31 has a central aperture defining an opening 47 adapted to seat the base of the fan motor 21. Four equally spaced apertures defining openings 48 about the interior of the generally triangular motor mount base 31 receive bolts 49 which secure the fan motor 20 to the generally triangular motor mount base 31. The fan 10 is integrated with the fan motor 20. The impeller 50 is comprised of a lower horizontal circular ring 51. Integral with the lower horizontal circular ring 51 are a series of vertical inclined vanes 52 equally spaced on lower horizontal ring 51. The top of the vertical inclined vanes 52 are fastened to an upper horizontal circular member 53 having a central aperture defining an opening 54.

As seen in FIG. 4 the short interior wall 4 of frusto-conical air inlet and blown air deflector 2 extends into the central opening 47 of fan 50 to deliver air into the central portion of fan 50. As also seen in FIG. 3 over two thirds of the impeller 50 is located within outwardly inclined section 7 and lowered flared section 8 of bifurcated conical air inlet and blown air deflector 2.

Figure 2:
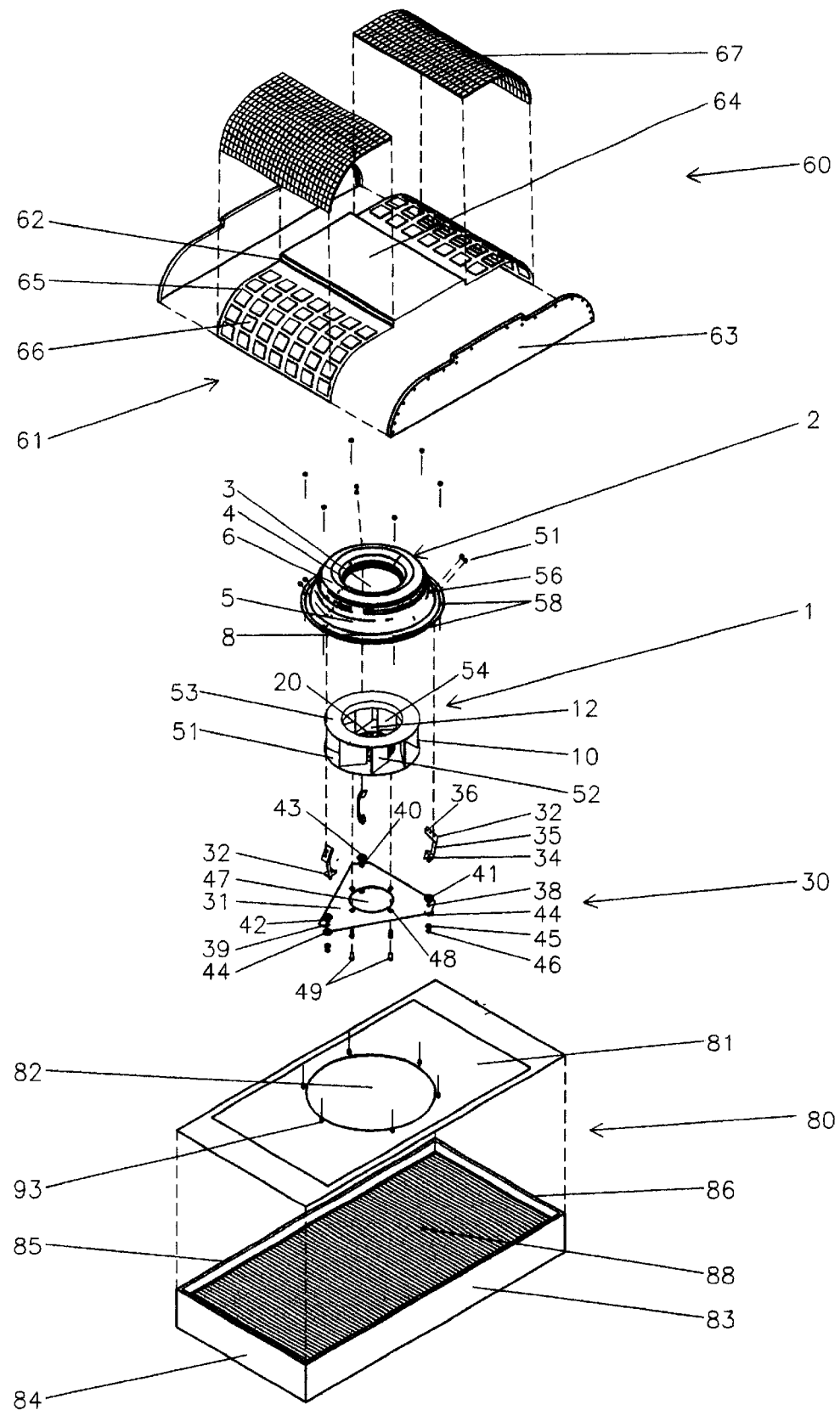
FIG. 2 is an exploded view of a clean air module comprised of an air pre-filter assembly, the multi-use fan and fan motor assembly and a final filter assembly.

Referring to FIG. 2, the multi-use fan and fan motor air assembly 1 is shown in combination with an air pre-filter assembly 60 and a final filter assembly 80 to form a clean air module.

Figure 3:
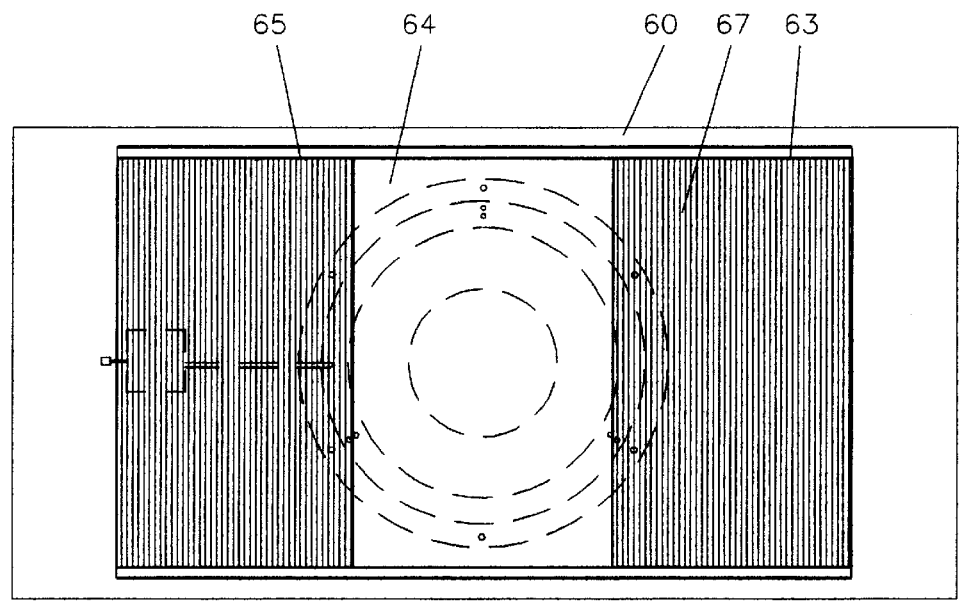
FIG. 3 is a top view of the clean air fan filter module of FIG. 2.

Referring to FIG. 2 and 3 the air pre-filter assembly 60 is comprised of a housing 61 having a top 62 and sides 63. The sides 63 are continuous. The top 62 has a continuous raised flat central part 64 integrally connected on either side to convex curved walls 65 having a series of apertures defining openings 66. Pre-filters 67 are fastened over the curved walls 65 covering the openings 66 in the curved walls. The sides 63 and curved walls 65 terminate in a common plane so that the air pre-filter assembly 60 can be mounted on the central top portion of the final filter assembly 80 and sealed thereto.

Referring to FIG. 2, the final filter assembly 80 is shown in combination with the multi-use fan and fan motor air assembly 1 and the air pre-filter assembly 60 to form an integral clean air module.

Referring to FIG. 2 the final filter assembly 80 is comprised of continuous final filter assembly top 81 having a central aperture defining an opening 82. As seen in FIG. 4 the top 81 of the final filter assembly 80 has integral vertical downward side-walls 83, 84, 85 and 86 with inward perpendicular edges 87 adapted to receive and support a final filter 88. As seen in FIG. 5, an alternate configuration of a final filter assembly has filter side walls 83, 84, 85 and 86 that are not integral with the top 81. A retaining strip 89 receivable in the bottom of side walls 83, 84, 85 and 86 is used to mount or remove the final filter 88 from the bottom of side walls 83, 84, 85 and 86.

Figure 6:
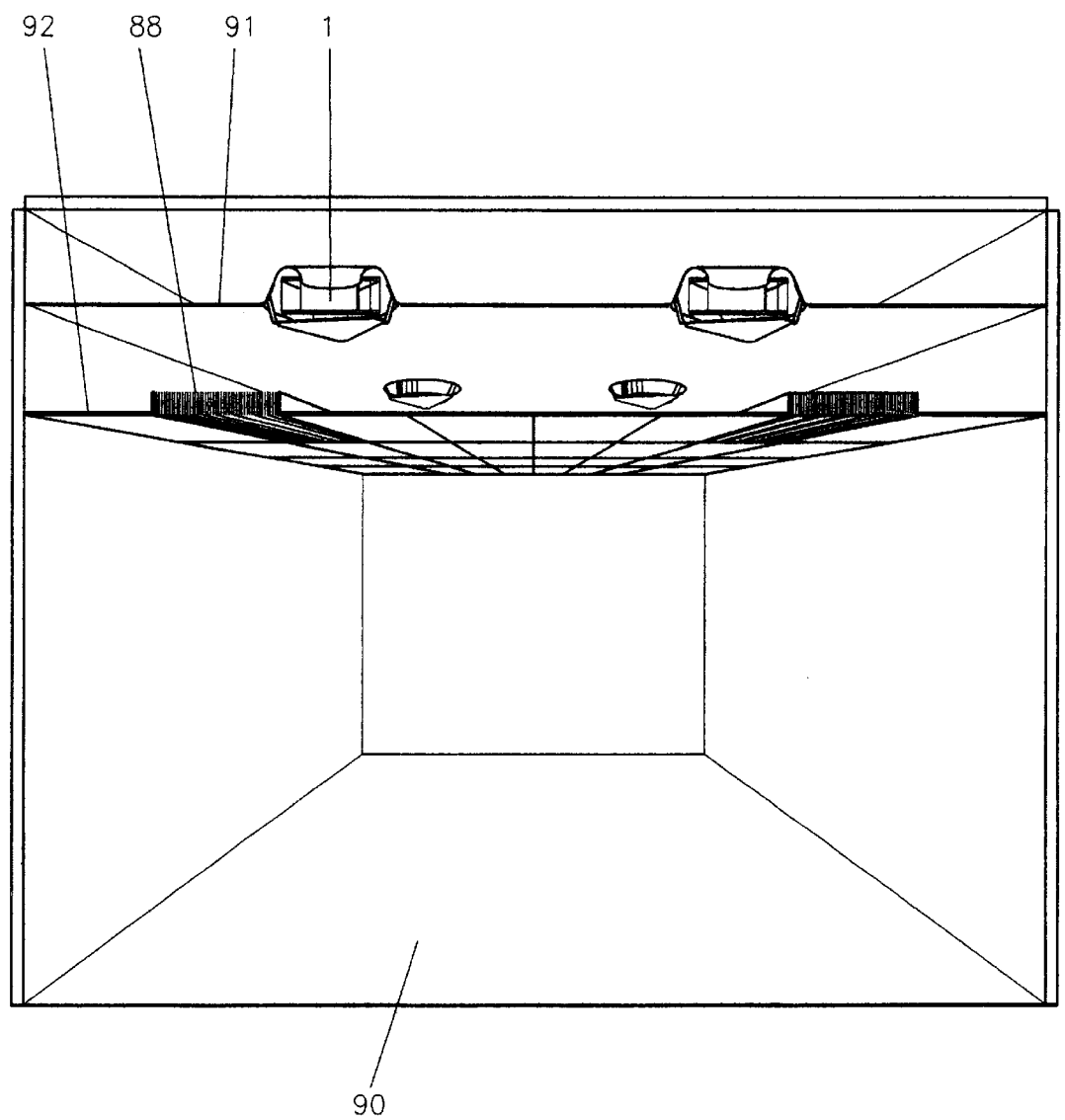
FIG. 6 is a perspective view of a clean room having a suspended ceiling supporting a series of multi-use fan and fan motor assemblies and a lower suspended ceiling supporting final filters which can be changed from within the room.

Referring to FIG. 6 there is shown a clean room 90 having an upper suspended ceiling 91 and a lower suspended ceiling 92. A series of multi-use fan and fan motor mount assemblies 1 are mounted in the upper suspended ceiling. There is a source of pre-filtered air available above the upper suspended ceiling so that an air pre-filter assembly 60 need not be used in combination with the multi-use fan and fan motor air assembly 1. In the event that pre-filtered air was not available above the upper suspended ceiling 91 an air pre-filter assembly 60 is used in combination with the multi-use fan and fan motor air assembly. The lower suspended ceiling 92 includes a series of final filters 88 which form part of the ceiling and are fastened thereto by retaining strips 89 such that the final filters 88 may be changed from within the clean room.

FIG. 2 discloses the multi-use fan and fan motor mount assembly 1 in combination with the air pre-filter assembly 60 and the final filter assembly 80 integrally fastened together to form a clean air module. As seen in FIG. 2 the top 81 of the final filter assembly 80 includes a central opening 82. Equally spaced about the central opening 82 are a series of studs 93. The location of the studs 93 on the top 81 corresponds with the location of the apertures defining a corresponding series of openings 58 in the lower flared section 8 of the bifurcated conical air inlet and blown air deflector 2 of the multi-use clean air and fan motor assembly 1. The final filter assembly 80 is fastened to the multi-use clean air and fan motor assembly 1 by fasteners installed through the respective indexed openings 89 and 58. The pre-filter air assembly 60 is seated on the top cover 81 of the final filter assembly 80 and is fastened thereto using leak free joining material.

In operation when the fan 10 is turned on, air is drawn through the pre-filters 67 through apertures 66 and travels horizontally under the raised central part 64 of top 62 until drawn into the central opening 3 of the bifurcated conical air inlet and blown air deflector 2. The pre-filtered air is drawn into the central opening 12 of the fan 10. As seen in FIGS. 4 and 5 the blown pre-filtered air is blown by the inclined vanes 52 integral with the lower horizontal circular ring 51 towards the inside of the inclined outer wall 5 and partially towards the side walls 83, 84, 85 and 86 of the final filter assembly 80. The blown pre-filtered air exits the clean air module through the final filter 88.

As seen in FIG. 6 the multi-use fan and fan motor mount assembly 1 is shown mounted in the upper suspended ceiling 91 of a clean room 90. The space above the upper suspended ceiling is provided with pre-filtered air. In the event that the space above the upper suspended ceiling was not provided with pre-filtered air the multi-use fan and fan motor mount assembly 1 would be used in combination with a pre-filter assembly 60. As seen in FIG. 6, a lower suspended ceiling 92 includes a series of final filters 88 forming part of the lower suspended ceiling permitting the finally filtered air from the multi-use clean air fan and fan motor mount assembly 1 to enter the clean room 90.

Figure 7:
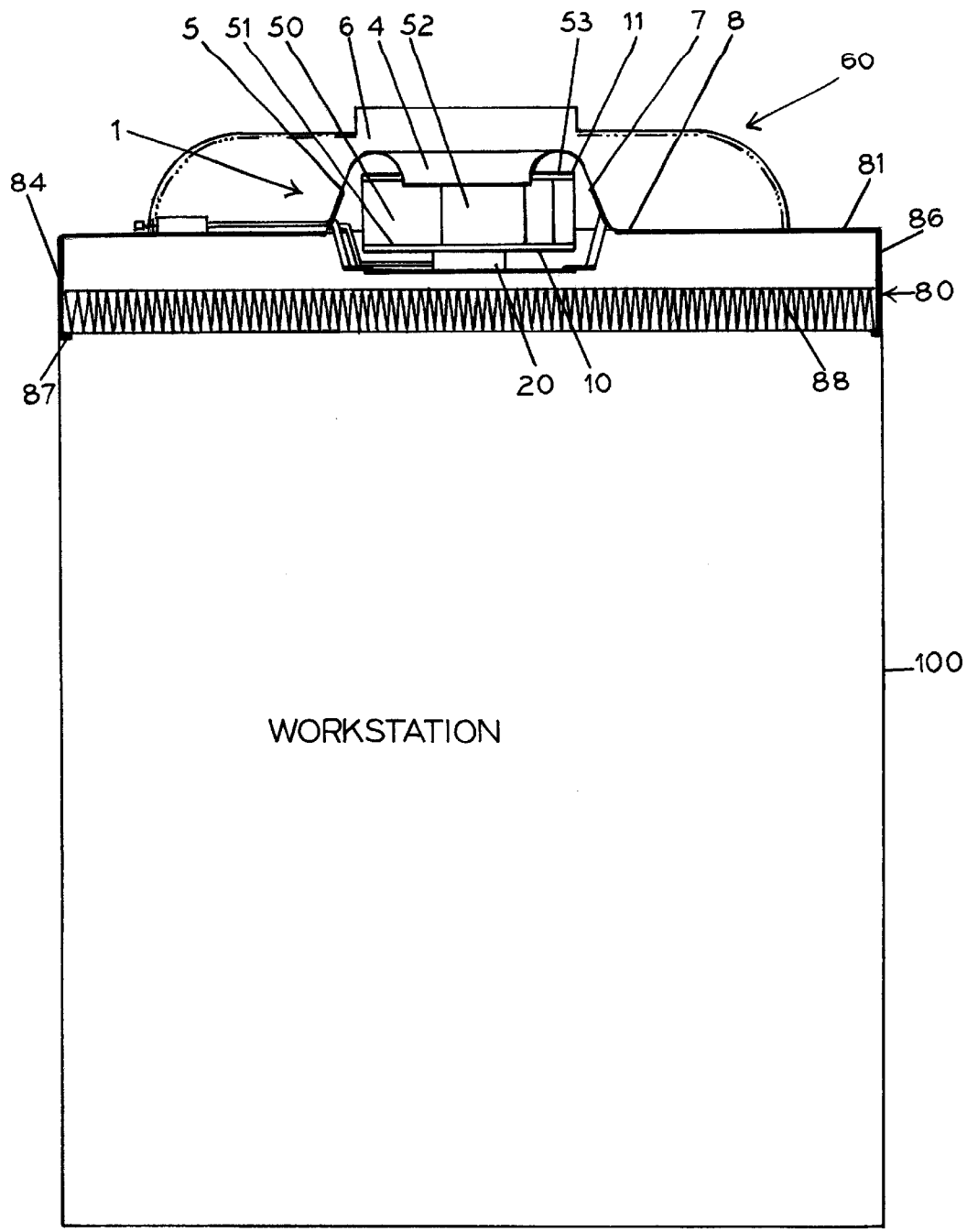
FIG. 7 is a perspective view a fan and fan motor mount assembly mounted over a work station represented schematically by a box.

As shown in FIG. 7, a workstation 100 has a pre-filter assembly 60 fastened above the inlet of the bifurcated conical air inlet and blown air deflector 2 of the multi-use fan and fan motor mount assembly 1, and a final filter assembly 80 fastened below the blown air deflector 2.

Figure 8:
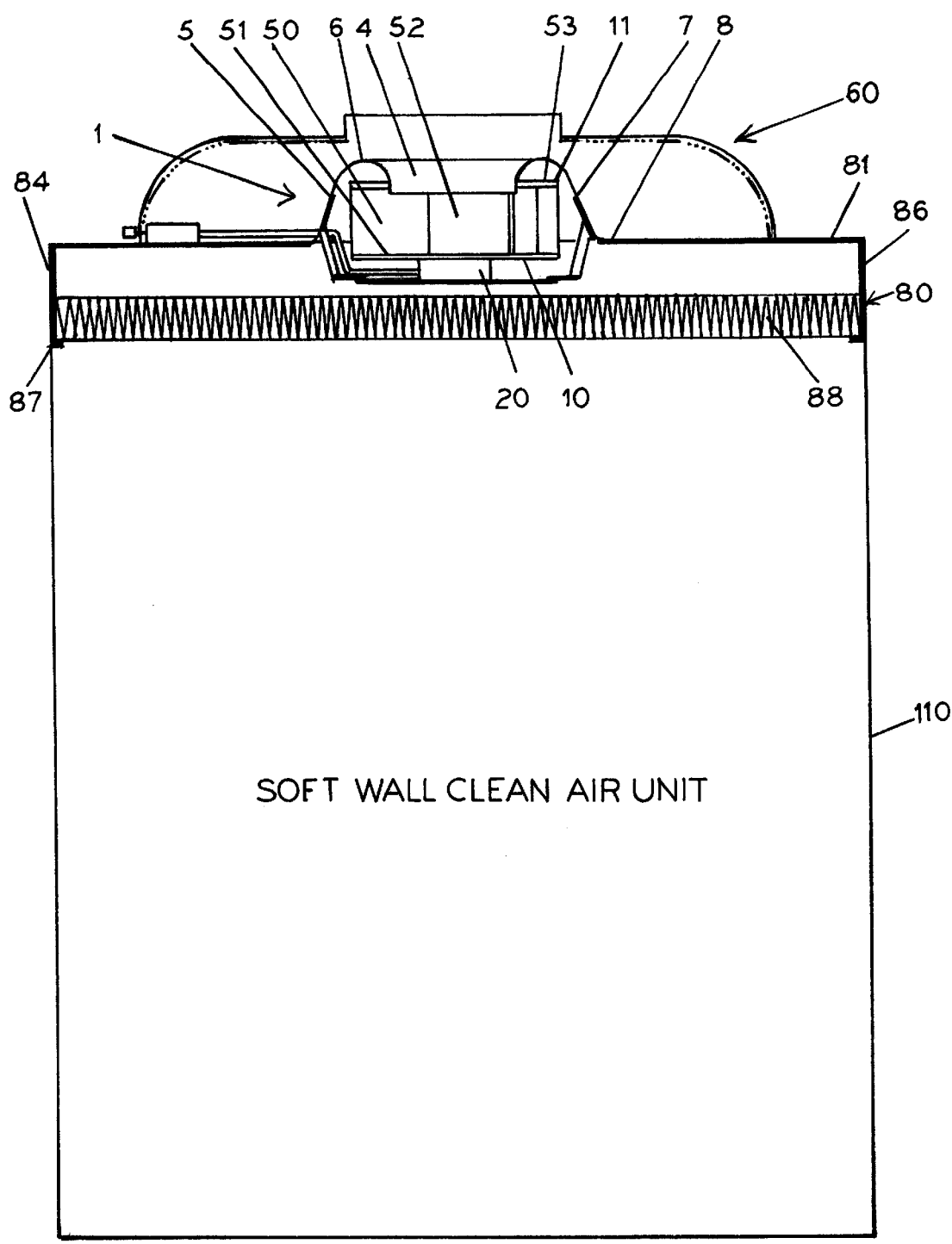
FIG. 8 is a perspective view of a fan and fan motor mount assembly mounted over a soft wall clean air unit represented schematically by a box.

As shown in FIG. 8, a soft wall clean air unit 110 has a pre-filter assembly 60 fastened above the inlet of the bifurcated conical air inlet and blown air deflector 2 of the multi-use fan and fan motor mount assembly 1, and a final filter assembly 80 fastened below the blown air deflector 2.

Figure 9:
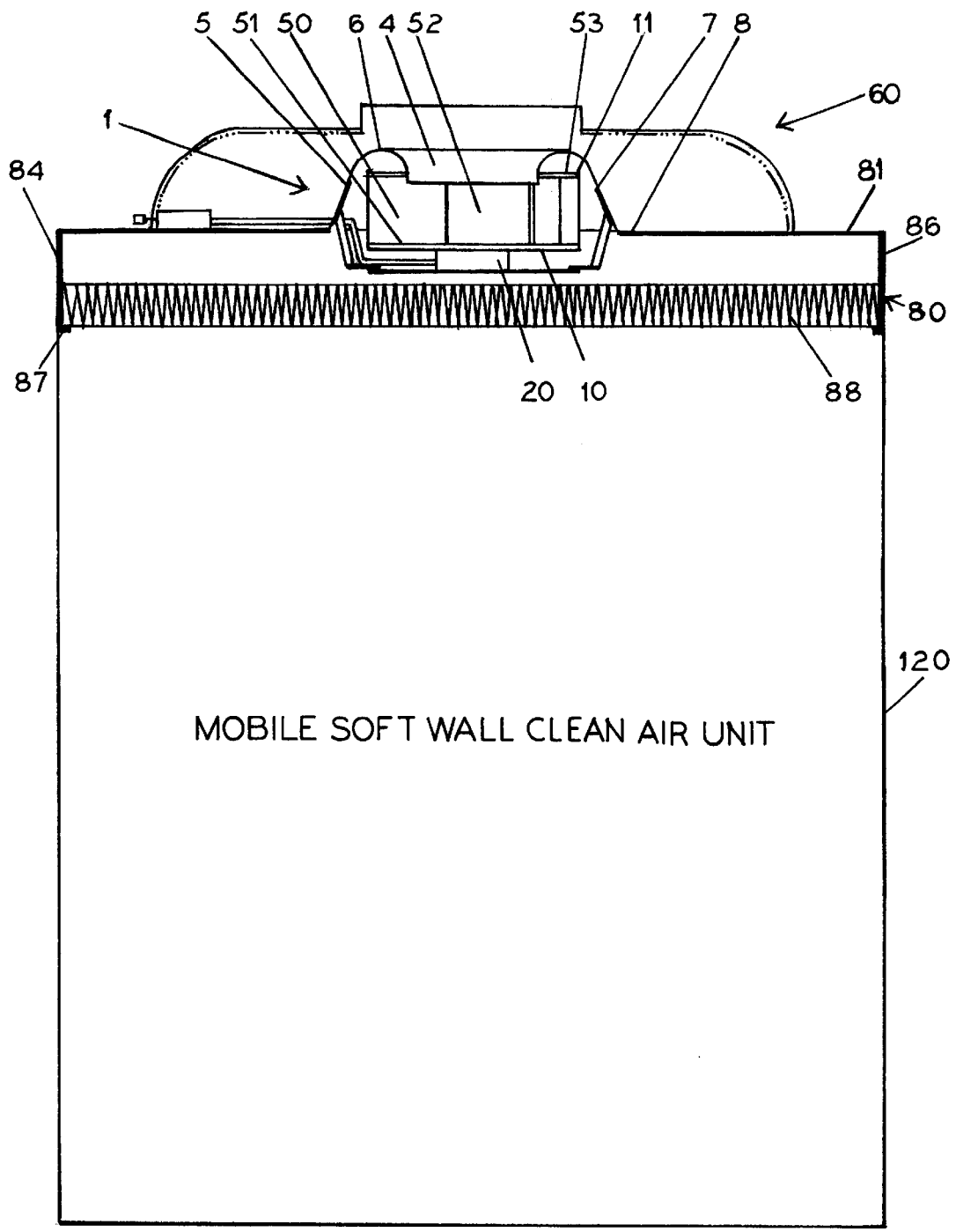
FIG. 9 is a perspective view of a fan and fan motor mount assembly mounted over a mobile soft wall clean air unit represented schematically by a box.

As shown in FIG. 9, a mobile soft wall clean air unit 120 has a pre-filter assembly 60 fastened above the inlet of the bifurcated conical air inlet and blown air deflector 2 of the multi-use fan and fan motor mount assembly 1, and a final filter assembly 80 fastened below the blown air deflector 2.

The multi-use fan and fan motor mount assembly of this invention may be used in many applications including clean air modules, clean air workstations, clean rooms, sterile suite ceiling systems, modular clean air units and soft wall clean air units.

What is claimed is:

1. A multi-use clean air fan and fan motor mount assembly comprising a bifurcated conical air inlet and blown air deflector, a fan motor mount, motor mount supports, a fan motor and a fan, the bifurcated conical air inlet and blown air deflector having a long outer wall, and a short inner wall, the fan motor mount suspended from the bifurcated conical air inlet and blown air deflector by motor mount supports fastened between the outer wall of the bifurcated conical air inlet and blown air deflector and the fan motor mount, an aperture defining a central opening in the top of the bifurcated conical air inlet and blown air deflector, the fan and fan motor having a common longitudinal axis with the longitudinal axis of the bifurcated conical air inlet and blown air deflector, the fan having a series of vanes extending outwardly from the central longitudinal axis of the fan, the inside of the long outer wall of the bifurcated conical inlet and blown air deflector surrounding between two-thirds and three quarters of the vertical height of the vanes of the fan.

2. The multi-use clean air fan and fan motor mount assembly of claim 1 in a modular clean air module, the modular clean air module comprising in combination a pre-filter, a multi-use fan and fan motor mount assembly, and a final filter assembly, the pre-filter fastened above the inlet of the bifurcated conical air inlet and blown air deflector, the final filter supported below the blown air deflector of the bifurcated conical air inlet and blown air deflector.

3. The multi-use clean air fan and fan motor mount assembly of claim 1 in a workstation, the workstation comprising a pre-filter assembly, a multi-use clean air fan and motor mount assembly and a final filter assembly, the pre-filter assembly fastened above the inlet of the bifurcated conical air inlet and blown air deflector, the final filter assembly fastened below the blown air deflector of the bifurcated conical air inlet and blown air deflector.

4. The multi-use clean air fan and fan motor mount assembly of claim 1 in a soft wall clean air unit, the soft wall clean air unit having a pre-filter assembly and a final filter assembly, the pre-filter assembly fastened above the inlet of the bifurcated conical air inlet and blown air deflector, the final filter assembly fastened below the blown air deflector of the bifurcated conical air inlet and blown air deflector.

5. The multi-use clean air fan and fan motor mount assembly of claim 1 in a mobile soft wall clean air unit, the mobile soft wall clean air unit comprising a pre-filter assembly, a multi-use clean air fan and fan motor mount assembly and a final filter assembly, the pre-filter assembly fastened above the inlet of the bifurcated conical air inlet and blown air deflector, the final filter assembly fastened below the blown air deflector of the bifurcated conical air inlet and blown air deflector.

6. The multi-use clean air fan and fan motor mount assembly of claim 2 including a vibration isolation system, the vibration isolation system comprised of rubber isolators, the rubber isolators located between fasteners connecting the motor mount supports to the motor mount and the outer wall of the bifurcated conical air inlet and blow air deflector.

7. A clean air fan filter module comprising a pre-air filter assembly, a fan and fan motor mount assembly and a final filter assembly, the pre-filter assembly comprised of a pre-filter housing, and a pre-filter, the pre-filter housing including a series of openings in at least one side of the housing defining apertures, the pre-filter supported on the housing above said openings, the fan and fan motor mount assembly comprising a bifurcated conical air inlet and blown air deflector, a fan motor mount, motor mount supports, a fan motor and a fan, the bifurcated conical air inlet and blown air deflector having a long outer wall, and a short inner wall, a fan motor mount suspended by motor mount supports extending between the outer wall of the bifurcated conical air inlet and blown air deflector and the fan motor mount, an aperture defining a central opening in the top of the bifurcated conical air inlet and blown air deflector, the fan and fan motor having a common longitudinal axis with the longitudinal axis of the bifurcated conical air inlet and blown air deflector, the fan having a series of vanes extending outwardly from the central longitudinal axis of the fan, the inside of the long outer wall of the bifurcated conical inlet and blown air deflector surrounding more than half of the longitudinal height of the vanes of the fan, the final filter assembly comprising a final filter top, sidewalls and final filter.

8. A clean air module comprising in combination an air pre-filter assembly, a fan and fan motor mount assembly and a final filter assembly, in which the fan and fan motor mount assembly comprises a bifurcated conical air inlet and blown air deflector, a fan motor mount, motor mount supports, a fan motor and a fan, the bifurcated conical air inlet and blown air deflector having a long outer wall, and a short inner wall, an aperture defining a central opening in the top of the bifurcated conical air inlet and blown air deflector, the fan and fan motor having a common longitudinal axis with the longitudinal axis of the bifurcated conical air inlet and blown air deflector, the fan having a series of vanes extending outwardly from the central longitudinal axis of the fan, the inside of the long outer wall of the bifurcated conical inlet and blown air deflector surrounding $2/3$ to $3/4$ of the longitudinal height of the vanes of the fan.

9. The clean air module of claim 8 in which the air pre-filter assembly is comprised of a housing, the housing having apertures in at least one side of the housing, pre-filter material fastened to the housing covering said apertures.

* * * * *